J. CARROLL.
ADJUSTABLE PISTON RING PACKING.
APPLICATION FILED APR. 16, 1914.
1,140,948. Patented May 25, 1915.
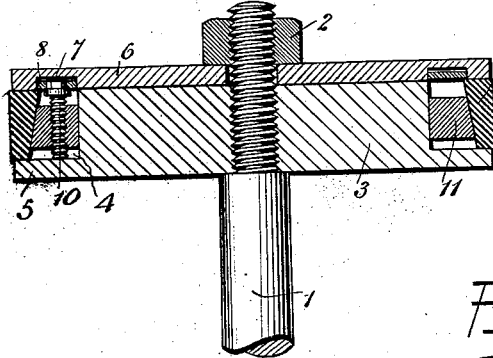
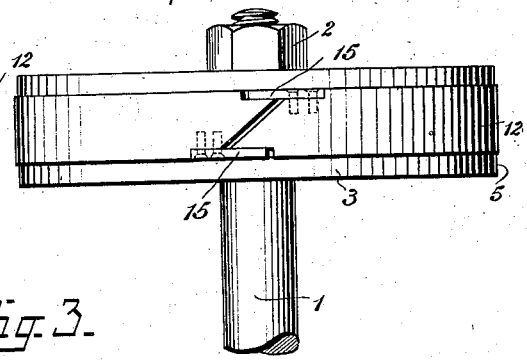
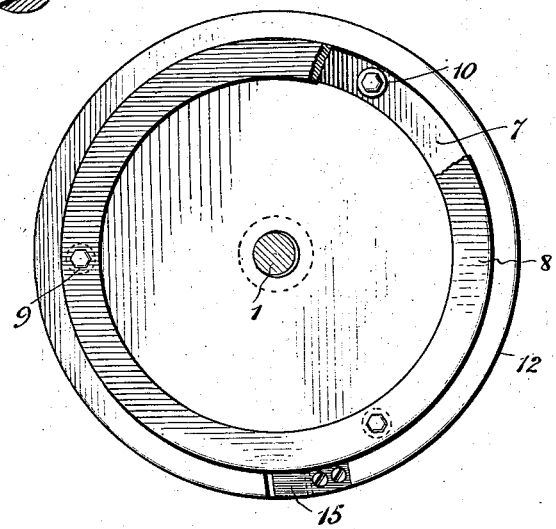
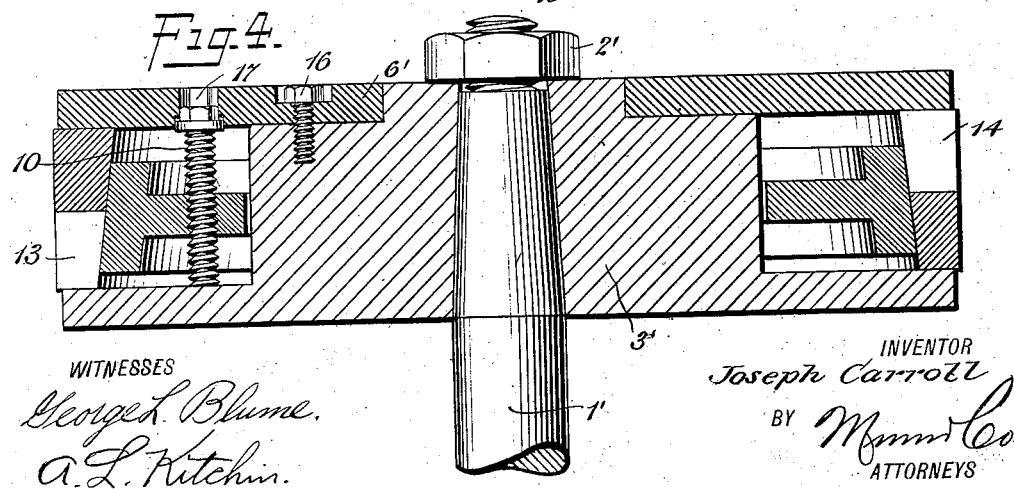
WITNESSES
George L. Blume.
A. L. Kitchin.
INVENTOR
Joseph Carroll
BY Munn & Co.
ATTORNEYS

UNITED STATES PATENT OFFICE.

JOSEPH CARROLL, OF NEW YORK, N. Y.

ADJUSTABLE PISTON-RING PACKING.

1,140,948.  Specification of Letters Patent.  Patented May 25, 1915.

Application filed April 16, 1914. Serial No. 832,251.

*To all whom it may concern:*

Be it known that I, JOSEPH CARROLL, a subject of the King of England, and a resident of the city of New York, borough of Brooklyn, county of Kings, and State of New York, have invented a new and Improved Adjustable Piston-Ring Packing, of which the following is a full, clear, and exact description.

This invention relates to improvements in pistons, and piston ring packings, and has for an object to provide an improved structure wherein there will be no pressure of the expanding ring against the cylinder, and consequently no appreciable wear thereof.

Another object in view is to provide a ring which must be expanded from the interior, and means for expanding the same which cannot move in a reverse direction so that the expanded ring will always be maintained in its proper position.

A still further object in view is to provide a locking ring for preventing the adjusting screws used in expanding the friction ring from backing off and thereby affecting the position of the friction ring.

In carrying out the object of the invention a piston is provided with a body and a clamping plate, the body being grooved or provided with an off-set for accommodating the friction ring and expanding the members. The expanding members are beveled on the exterior for engaging the beveled interior of the expanding ring, whereby when adjusting screws associated therewith are rotated the expanding ring will be expanded to the proper extent. The adjusting screws are provided with heads formed with a plurality of sides, which heads are designed to fit into a locking ring, whereby the screws are prevented from backing off, or a reverse rotation.

In the accompanying drawings—Figure 1 is a section through a piston embodying the invention, part of a piston rod being shown in connection therewith; Fig. 2 is an edge view of the piston shown in Fig. 1; Fig. 3 is a plan view of a piston with the end plate removed and the locking ring broken away adjacent one of the adjusting screws; Fig. 4 is a sectional view similar to Fig. 1, but disclosing a slightly modified form of the invention.

Referring to the accompanying drawings by numeral 1 indicates a piston-rod provided with the usual clamping nut 2 for retaining the piston in place. The piston is provided with a body 3 having a cut-out portion 4, whereby an annular flange 5 is produced.

Arranged opposite annular flange 5 is a clamping plate 6 which is held against body 3 by nut 2. Plate 6 is provided with an annular groove 7 for accommodating the locking ring 8, which ring is provided with an aperture 9 for each of the clamping screws 10. Any desired number of clamping screws 10 may be provided, and are formed with many sided heads, as for instance a six sided head. The apertures 9 are provided with an equal number of sides to the sides of the heads of the screws 10 so as to properly receive the same. By providing, for instance, a six sided head on screws 10, the screws may be adjusted for one sixth of a rotation. If there are eight sides on each head the screws may be adjusted to one eighth of a revolution, and so on, according to the various requirements. The various screws 10 expand through an expanding ring 11, which is beveled on its outer face so as to engage the beveled inner face of the friction ring 12. The ring 11 is preferably formed with a sufficiently large bore as to loosely fit body 3 and thereby permit the friction ring 12 to float so as to adjust itself properly to the cylinder.

In operation, when it is desired to expand the ring 12 from the position shown in Fig. 1, nut 2 is removed and also plate 6, together with locking ring 8. Each of the screws 10 are then turned to the desired extent, each screw being turned an equal amount. Locking ring 8 is then placed in position, together with plate 6 and nut 2. Upon the screwing of nut 2 tightly against plate 6 the plate 6 will force ring 12 against flange 5, and as ring 12 is moved toward flange 5 the same will engage ring 11 and be expanded thereby, ring 11 having been moved away from flange 5 by the adjusting screws. In the use of ordinary spring friction rings, the rings either press outwardly automatically or against the cylinder, and thus produce a greater or less positive friction.

In the present invention the ring 12 has no tendency to spring outwardly but rather a tendency to spring or close inwardly. The expansion means used expands the ring 12 and holds the same in an expanded position so that the ring associated with the piston does not press against the cylinder. This produces the same effect as if it were a solid piston exactly fitting the cylinder.

In Fig. 4 will be seen a modified form of the invention in which the ring is split so that one ring may be divided at point 13 and the other at point 14 on the opposite side of the piston and thereby obviate the necessity of the overlapping members 15 shown in Fig. 2. In the form of the invention shown in Fig. 4 the clamping plate 6' is not held in place by nut 2' but is held in place by a plurality of clamping screws 16. Part of the body 3' extends through a central bore in plate 6' so that nut 2' may clamp the piston 1' properly to body 3'. The clamping plate in this form of the invention is provided with apertures 17 for accommodating the heads of the screws 10 so that the clamping plate acts in the double capacity of a clamping plate and a locking ring for the adjusting screws. It is of course evident that an extra clamping plate similar to clamping plate 6' may be used, if desired, with the arrangement of plate shown in Fig. 4.

What I claim is—

1. A piston comprising a body, a packing ring therefor, an expanding ring arranged interiorly of said packing ring, said expanding ring having a beveled face engaging said expanding ring, a plurality of screws engaging said expanding ring and said body, whereby when said screws are operated in one direction said expanding ring will act on said packing ring so as to expand the same, and a locking ring having means surrounding the heads of said screws for locking said adjusting screws against rotation.

2. A piston comprising a body, a packing ring therefor adapted to contract when released, a ring engaging said packing ring for expanding the packing ring, a plurality of screws engaging said last mentioned ring and said body for moving said last mentioned ring in respect to said body so as to cause said packing ring to expand, and a clamping plate formed with apertures for receiving the heads of said screws for locking the screws against rotation.

3. A piston comprising a body, a packing ring arranged on said body, an expanding ring arranged between said packing ring and said body, the inner face of said packing ring being beveled, and the outer face of said expanded ring being beveled, a plurality of screws on said body and said expanding ring for causing the expanding ring to move relative to said body so that the bevel on the expanding ring will cause the packing ring to be expanded each of said screws being formed with a polygonal sided head, a locking ring formed with apertures having polygonal walls for receiving the heads of said screws for preventing the rotation thereof, and a clamping plate for holding in place said locking ring and said packing ring.

4. A piston comprising a body, an expansion ring, a member having a beveled face engaging said expansion ring for expanding the same, a plurality of screws acting on said member for causing the same to expand said ring, a locking ring provided with an aperture for receiving the head of each of said screws, said aperture and heads being irregular in shape, whereby said screws are prevented from working loose, and means for clamping said locking ring in position.

In testimony whereof I have signed my name to this specification in the presence of two subscribing witnesses.

JOSEPH CARROLL.

Witnesses:
A. L. KITCHIN,
G. H. EMSLIE.